United States Patent
Rajendran et al.

(10) Patent No.: US 11,768,852 B2
(45) Date of Patent: Sep. 26, 2023

(54) SYSTEM AND METHOD FOR DATA ANALYSIS AND PRESENTATION OF DATA

(71) Applicant: Marlabs Innovations Private Limited, Bangalore (IN)

(72) Inventors: Senthil Nathan Rajendran, Bangalore (IN); Selvarajan Kandasamy, Bangalore (IN); Tejas Gowda BK, Bangalore (IN); Mitali Sodhi, Bangalore (IN); Gulshan Gaurav, Bangalore (IN)

(73) Assignee: Marlabs Incorporated, Piscataway, NJ (US)

( * ) Notice: Subject to any disclaimer, the term of this patent is extended or adjusted under 35 U.S.C. 154(b) by 0 days.

(21) Appl. No.: 15/949,971

(22) Filed: Apr. 10, 2018

(65) Prior Publication Data

US 2019/0197172 A1    Jun. 27, 2019

(30) Foreign Application Priority Data

Dec. 27, 2017    (IN) .............................. 201741046793

(51) Int. Cl.
| | |
|---|---|
| *G06F 15/16* | (2006.01) |
| *G06F 16/26* | (2019.01) |
| *G06F 16/248* | (2019.01) |
| *G06F 16/28* | (2019.01) |
| *G06F 40/56* | (2020.01) |
| *G06F 40/169* | (2020.01) |
| *G06F 3/04847* | (2022.01) |

(52) U.S. Cl.
CPC ............ *G06F 16/26* (2019.01); *G06F 16/248* (2019.01); *G06F 16/288* (2019.01); *G06F 40/169* (2020.01); *G06F 40/56* (2020.01); *G06F 3/04847* (2013.01)

(58) Field of Classification Search
None
See application file for complete search history.

(56) References Cited

U.S. PATENT DOCUMENTS

| | | |
|---|---|---|
| 9,286,290 B2 | 3/2016 | Allen et al. |
| 9,378,270 B2 | 6/2016 | Sekar |
| 9,483,455 B1 | 11/2016 | Bastide et al. |

(Continued)

FOREIGN PATENT DOCUMENTS

| | | |
|---|---|---|
| EP | 3100178 A1 | 12/2016 |
| WO | 2017/000114 | 1/2017 |

*Primary Examiner* — Alex Gofman
(74) *Attorney, Agent, or Firm* — Jason C. Cameron

(57) ABSTRACT

A system and method for data analysis and presentation of data are provided. The system for data analysis and presentation of data includes a memory configured to receive a plurality of data sets. The system also includes a processing subsystem operatively coupled to the memory and configured to determine a plurality of properties of the plurality of data sets, to analyse a categorical variable of the plurality of data sets based on the plurality of properties of the plurality of the plurality of data sets, to identify one or more custom rules based on an analysed categorical variable, to interpret the identified one or more custom rules, to identify a graph based on one or more custom rules, to identify one or more textual insights based on one or more custom rules and the identified graph, to present the identified graph and one or more textual insights.

6 Claims, 10 Drawing Sheets

(56) References Cited

U.S. PATENT DOCUMENTS

| | | | |
|---|---|---|---|
| 2010/0070489 A1* | 3/2010 | Aymeloglu | G06F 16/2428 707/E17.001 |
| 2010/0153332 A1* | 6/2010 | Rollins | G06Q 10/10 707/603 |
| 2011/0106851 A1* | 5/2011 | Swartz | G06Q 30/0603 707/780 |
| 2012/0313949 A1* | 12/2012 | Rope | G06F 16/9038 345/440 |
| 2015/0205827 A1* | 7/2015 | Sengupta | G06Q 10/0637 707/690 |
| 2016/0162456 A1* | 6/2016 | Munro | G06F 16/243 704/9 |
| 2016/0370197 A1* | 12/2016 | Miller | G06Q 10/047 |
| 2017/0371856 A1* | 12/2017 | Can | G06K 9/6201 |

* cited by examiner

SYSTEM AND METHOD FOR DATA ANALYSIS AND PRESENTATION OF DATA

CROSS-REFERENCE TO RELATED APPLICATION

This application claims the benefit of complete patent application having Patent Application No. 201741046793 filed on Dec. 27, 2017 in India.

BACKGROUND

Embodiments of the present disclosure relate to data analysis and presentation, and more particularly to a system and method for data analysis and presentation of data.

Data analysis is a process of inspecting, cleansing, transforming, and modelling data with the goal of discovering useful information, suggesting conclusions, and supporting decision-making. Further, the processed data is presented in different ways.

In one approach, the system determines a structure of the received data and analysing the data of the structure and identifying one or more insights to present the same. However, in such systems, multiple insights are presented which makes a user to spend more time in further analysing the presented insights.

In another approach, the system performs analysis for a one or more identified questions asked by the user. The analysis is performed based on the set of stored pre-defined data. The system does the analysis based on the provided data analysis engine. Further the system displays the analysed data in the form of an instant text message, a voice message, an e-mail or a web interface. However, in such systems the data set to be analysed is not predicted by the system. Also such system may miss out analysing one or more questions asked by the user.

In yet another approach, the system analysing a plurality of data from the pre-defined set in a computing device. The system automatically identifies the relevant data set which has to be identified from the pre-defined data set. The system also uses natural language to communicate between the user and the system. Further, the system produces one or more insights based on the strength of the data. However, in such system, the analysed data is not presented in a simple format which makes the analysis difficult to understand by the user, hence the user has to further analyse the data accordingly to understand the analysis done by the system.

In yet another approach, the system uses a basic statistical machine learning model to analyse the set of data. The system identifies one or more key elements from a pre-defined text and a pre-defined table of data for further analysis of the data. The identified set of data is further matched with the insights which are in a pre-defined template form and is further presented in the form of the natural language. However, in such approach, the system does not identify the relevant data set automatically. Also analysis of the data is not done based on the strength of the data set. Further, the presentation of the analysed data is complicated. Also the system does not provide insights based on a particular variable require.

Hence, there is a need for an improved system and method for data analysis and presentation of data to address the aforementioned issues.

BRIEF DESCRIPTION

In accordance with one embodiment of the disclosure, a system and method for data analysis and presentation of data are provided. The system for data analysis and presentation of data includes a memory configured to receive a plurality of data sets. The system also includes a processing subsystem operatively coupled to the memory and configured to determine a plurality of properties of the plurality of data sets. The processing subsystem is also configured to analyse a categorical variable of the plurality of data sets based on the plurality of properties of the plurality of the plurality of data sets. The processing subsystem is further configured to identify one or more custom rules based on the plurality of data set. The processing subsystem is further configured to interpret the identified one or more custom rules. The processing subsystem is further configured to identify a graph based on one or more custom rules. The processing subsystem is further configured to identify one or more textual insights based on one or more custom rules and the identified graph. The processing subsystem is further configured to present the identified graph and one or more textual insights.

The method for data analysis and presentation of data includes receiving a plurality of data sets. The method also includes determining a plurality of properties of data set. The method further includes analysing the categorical variable of the plurality of data sets based on the plurality of properties of the plurality of data sets. The method further includes identifying one or more custom rules based on the plurality of data set. The method further includes interpreting the identified one or more custom rules. The method further includes identifying a graph based on one or more custom rules. The method further includes identifying one or more textual insights based on one or more custom rules and the identified graph. The method further includes presenting the identified graph and one or more textual insights.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
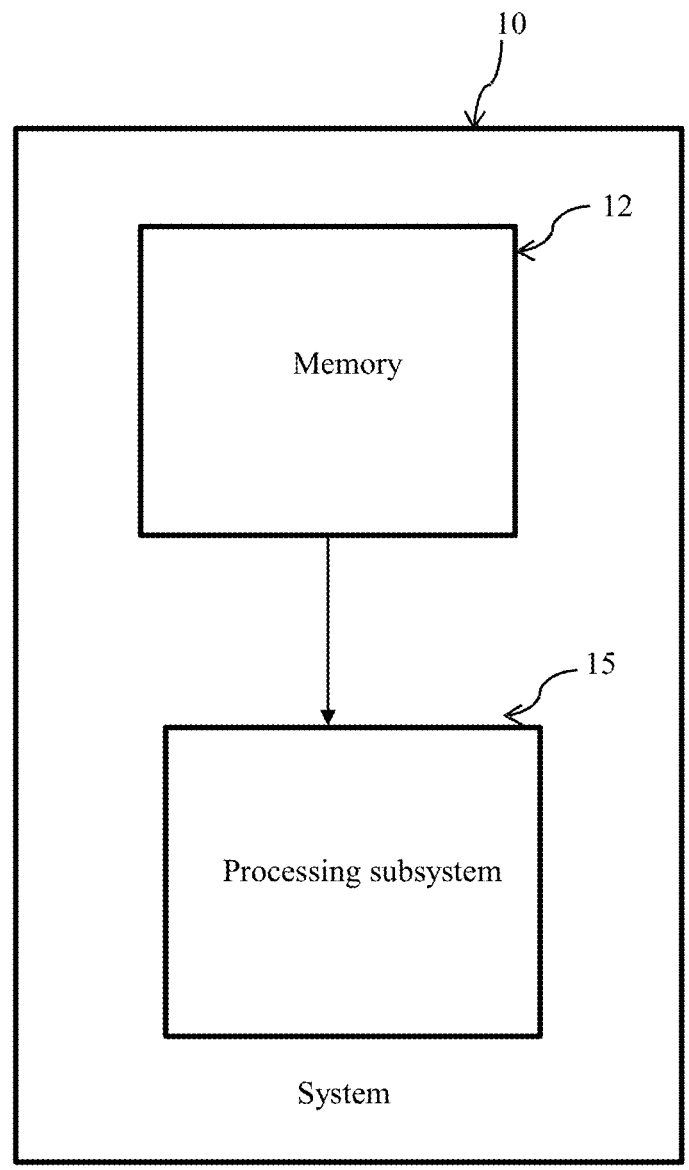
FIG. 1 is a block diagram of a system for data analysis and presentation of data in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for data analysis and presentation of data are disclosed. The system for data analysis and presentation of data includes a memory configured to receive a plurality of data sets. The system also includes a processing subsystem operatively coupled to the memory and configured to determine a plurality of properties of the plurality of data sets. The processing subsystem is also configured to analyse a categorical variable of the plurality of data sets based on the plurality of properties of the plurality of the plurality of data sets. The processing subsystem is further configured to identify a graph based on one or more custom rules. The processing subsystem is further configured to identify one or more textual insights based on one or more custom rules and the identified graph. The processing subsystem is further configured to present the identified graph and one or more textual insights.

FIG. 1 is a block diagram of a system (10) for data analysis and presentation of data in accordance with an embodiment of the present disclosure. The system (10) includes a memory (20) configured to receive a plurality of data sets. In one embodiment, the plurality of data sets may be received by a web, a local data, an experimental data or by manually entering the data into the memory. In another embodiment, the memory (10) may a random access memory (RAM), a read only memory (ROM), a cache memory or a flash memory. In such an embodiment, the memory (10) may store the plurality of data sets as a database. In yet another embodiment, the plurality of data sets may be a plurality of structured data, a plurality of unstructured data or a plurality of semi-structured data.

The system (10) also includes a processing subsystem (30) operatively coupled to the memory (20). The processing subsystem (30) is configured to determine a plurality of properties of the plurality of data sets. In one embodiment, the plurality of properties may be an instruction set, a data type, a hierarchy of data and a category of data. The processing subsystem (30) is also configured to analyse a categorical variable of the plurality of data sets based on the plurality of data sets. In another embodiment, the categorical variable may include a size of the plurality of data sets, a plurality of dimensions, a plurality of measures or a plurality of variables. As used herein, a categorical variable is a variable that can take on one of a limited, and usually fixed, number of possible values, assigning each individual or other unit of observation to a particular group or nominal category on the basis of some qualitative property.

The processing subsystem (30) is further configured to identify one or more custom rules based on the plurality of data set. In one embodiment, one or more custom rules may be one or more statistical tests and one or more data models. The processing subsystem (30) is further configured to interpret the identified one or more custom rules.

The processing subsystem (30) is further configured to identify a graph based on one or more custom rules. In one embodiment, the custom rules may be one or more statistical tests and one or more data models. As used herein, the statistical tests where two statistical data sets are compared, or a data set is obtained by sampling and is compared against a synthetic data set from an idealised model to obtain a statistical inference.

The processing subsystem (30) is further configured to identify one or more textual insights based on one or more custom rules and the identified graph. The processing system (30) is further configured to present the identified graph and one or more textual insights. In one embodiment, the identified graph and one or more textual insights may be presented or displayed on a display device. In such embodiment, the display device may be a display screen of a computer, a graphical user interface or a display on any hand held device. In such another embodiment, the display system may display the identified graph and one or more textual insights together on a single display or the identified graph and one or more textual insights may be displayed individually which may be selected by a user viewing the presentation of the data.

In another embodiment the identified graph may be represented as a bar graph, a line graph, a venn diagram, a histogram, a scatter plot chart, a candlestick chart, a pie chart or an area chart. As used herein textual insights is an understanding of a specific cause and effect within a specific context represented textually. In such embodiment, the textual representation of the insights may be in a natural language.

In one embodiment, the processing subsystem (30) may be further configured to analyse and presents a distribution of the categorical variable, determine an impact of other dimension parameters on the chosen categorical variable, determine an impact of measures over the categorical variable and generate recommendation results to increase or optimize the categorical variable.

Figure 2:
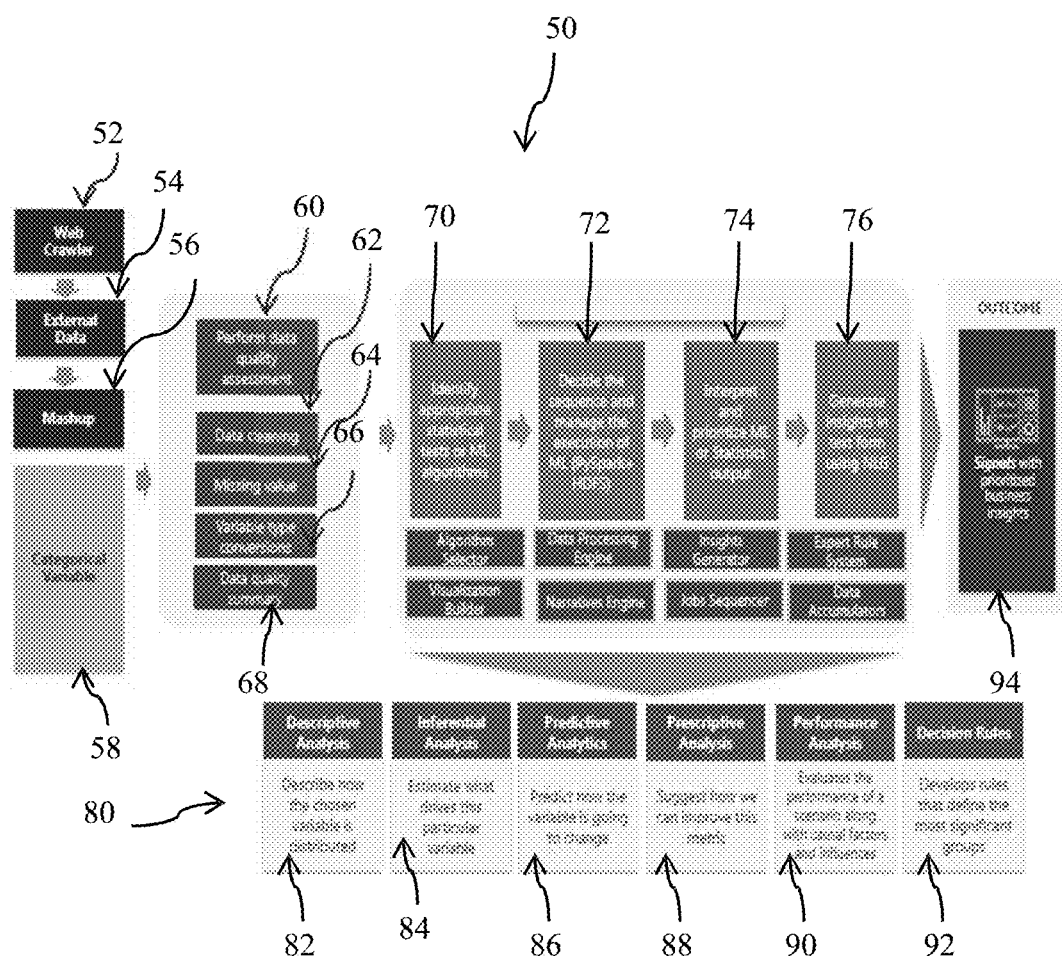
FIG. 2 is a schematic representation of an embodiment of the system for data analysis and presentation of data of FIG. 1 in accordance with an embodiment of the present disclosure.

FIG. 2 is a schematic representation of an embodiment of the system for data analysis and presentation of data of FIG. 1 in accordance with an embodiment of the present disclosure. The system (50) may receive a plurality of data sets from a web crawler (52). The plurality of data sets received from the web crawler (52) may be stored in a memory of the system.

The system (50) may receive a plurality of data sets from an external memory (54). For further analysis of the plurality of combined data, the system may perform a data quality assessment (60) on the plurality of data sets received from the web crawler (52) and external memory (54) to check if the system has selected a right quality of the plurality of data sets. Further, the system (50) may perform data cleaning (62) to correct one or more inaccuracies in the plurality of combined data sets.

As used herein, the data cleaning is a process of detecting, correcting or removing an inaccurate record from a record set, a table, or the database and refers to identifying an incomplete, an incorrect, an inaccurate or an irrelevant part of the data and then replacing, modifying, or deleting one or more coarse data. Further, if any incorrect or irrelevant value may be detected, the system (50) may further add or alter the incorrect or irrelevant value or may add a missing value (64) to the plurality of combined data sets.

Also, the system (50) may perform a plurality of conversions, in specific, the system (50) may perform variable type conversions (66). Further, the system (50) may provide a summary on the quality (68) of the plurality of data sets. Based on the data quality summary provided by the system (50), the plurality of data sets may be subjected to further analysis.

The system (50) includes a processing subsystem (15) operatively coupled to the memory. The processing subsystem includes a data accumulator configured to combine the plurality of data sets received from the web crawler (52) and external memory (54) using a mashup component to generate a plurality of combined data sets. The processing subsystem (15) also includes an expert rule system configured to determine a plurality of properties of the plurality of combined data sets. The expert rule system is also configured to identify a categorical variable based on the plurality of properties of the plurality of combined data sets. The expert rule system is further configured to determine one or more custom rules based on an identified categorical variable obtained from the plurality of combined data sets. The processing subsystem (15) further includes an algorithm selector configured to select one or more statistical tests or one or more machine learning models based on the one or more custom rules. The processing subsystem (15) further includes a job sequencer configured to decide a sequence and manage the execution of the one or more statistical tests or one or more machine learning models. The processing subsystem (15) further includes a data processing engine configured to analyse a performance of a scenario based on the sequence of execution of the one or more statistical tests or one or more machine learning models, wherein the data processing engine is configured to analyse a plurality of factors influencing the categorical variable. The processing subsystem (15) further includes a visualization builder configured to identify a graph based on the performance of the scenario. The processing subsystem (15) further includes an insights generator is configured to identify one or more textual insights based identified graph. The insights generator is also configured to generate the one or more textual insights in a natural language. The system (50) further includes a display device configured to present the identified graph and the one or more textual insights.

In such embodiment, the analysis (80) of one or more statistical data may be a descriptive analysis (82), in which the system (50) may describe how the selected plurality of data sets may be distributed. In such another embodiment, the analysis (80) of one or more statistical data may be an inferential analysis (84), in which the system (50) may estimate what plurality of parameters may drive a particular categorical variable (58). In such another embodiment, the analysis (80) of one or more statistical data may be a predictive analysis (86), in which the system (50) may predict or analyse for how long the categorical variable (58) may change.

In such another embodiment, the analysis (80) of one or more statistical data may be a prescriptive analysis (88), in which the system (50) may suggest the machine learning model how to improve the analysis of the plurality of data sets.

In such another embodiment, the analysis (80) of one or more statistical data may be a performance analysis (90), in which the system (50) may evaluate or analyse a performance of a scenario along with a plurality of factors influencing the categorical variable (58). In such another embodiment, the analysis (80) of one or more statistical data may be a set of decision rules (92), in which the system may develop a set of rules that may define a most significant group.

Figure 3:
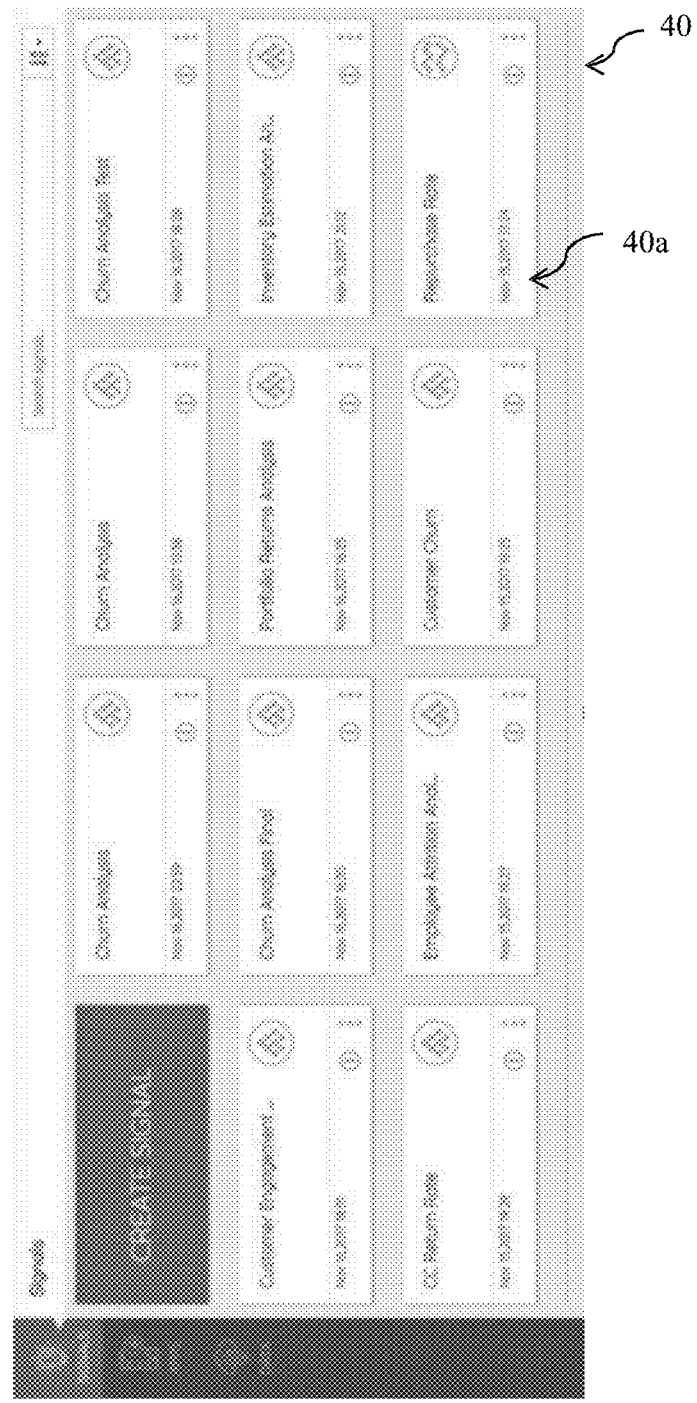
FIG. 3 is a schematic representation of first page of a graphical user interface of the system for analysis and representation of data of FIG. 1 in accordance with an embodiment of the present disclosure.

FIG. 3 is a schematic representation of first page of a graphical user interface of the system for analysis and representation of data of FIG. 1 in accordance with an embodiment of the present disclosure. The graphical user interface of the system (40) is an example for analysing and presenting the plurality of data which is related to a phone call. The method includes selecting a new project to create an analysis for a set of data (40a). Hence the user may select create signal. Further, the user may select a plurality of data sets from the memory which may be the plurality of internal data sets.

Figure 4:
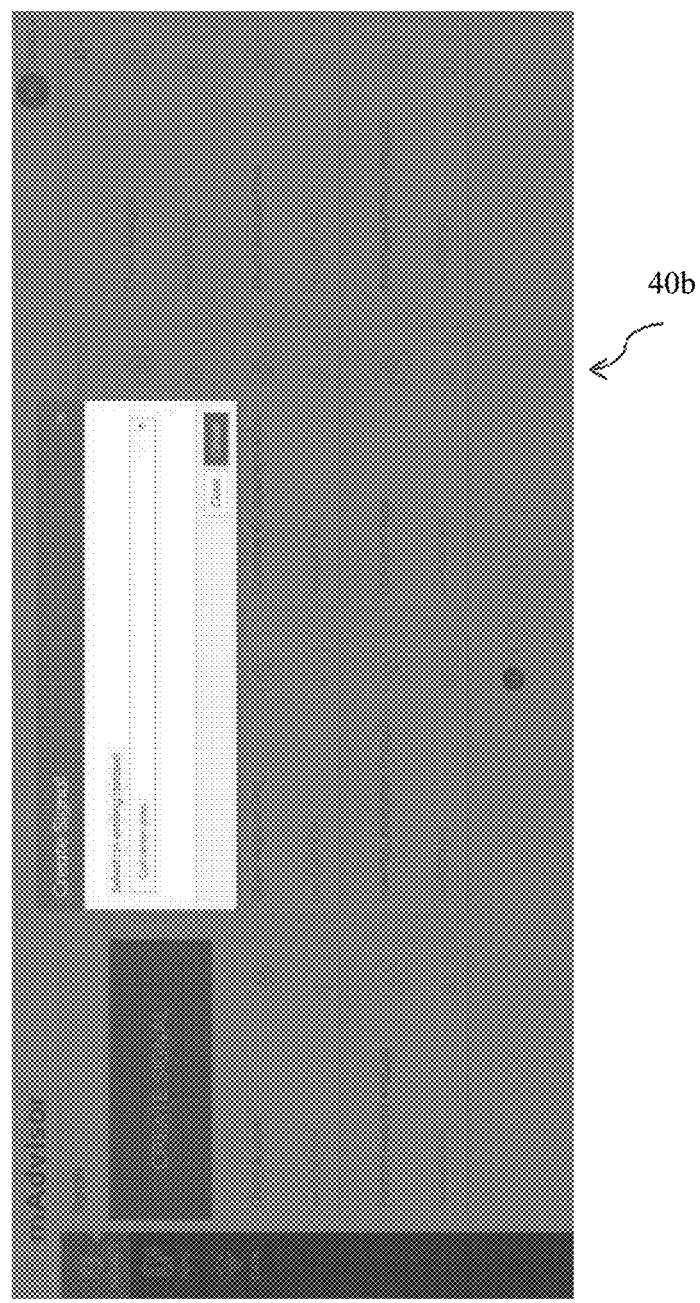
FIG. 4 is a schematic representation of second page of the graphical user interface of the system for analysis and representation of data of FIG. 1 in accordance with an embodiment of the present disclosure.

FIG. 4 is a schematic representation of second page of the graphical user interface of the system for analysis and representation of data of FIG. 1 in accordance with an embodiment of the present disclosure. The graphical user interface of the system (40) may represent the plurality of internal data and the plurality of external data in the form of rows and columns (40b).

Figure 5:
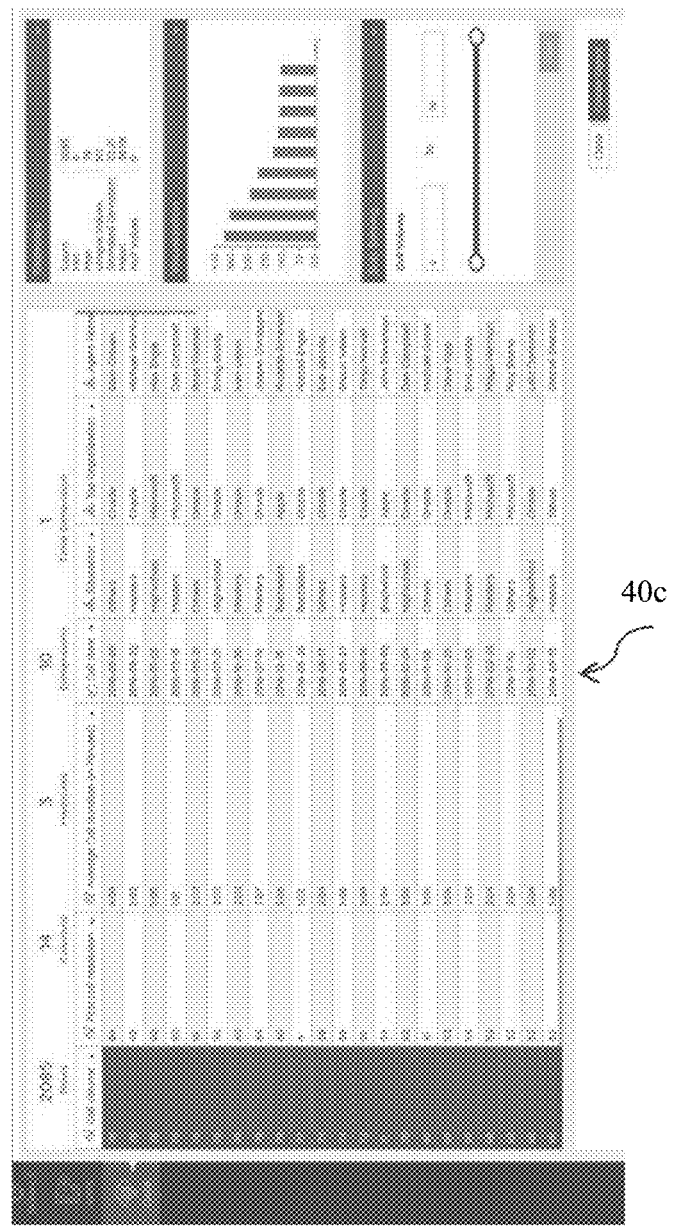
FIG. 5 is a schematic representation of third page of the graphical user interface of the system for analysis and representation of data of FIG. 1 in accordance with an embodiment of the present disclosure.

FIG. 5 is a schematic representation of third page of the graphical user interface of the system for analysis and representation of data of FIG. 1 in accordance with an embodiment of the present disclosure. The graphical user interface of the system (40) may also display a statistical data of a plurality of parameters (40c). In such embodiment, the plurality of parameters may be a count, a minimum value, a maximum value, a unique value, a standard deviation value, a mean and a null value. The graphical user interface may also display a visualization of the plurality of data sets in the form of a graph. The graphical user interface may also display a sub setting slab which may allow the user to select a required range of call volume (40c). Once the user sets the required parameters, the user may select create signal for analysing the call data according to the selected parameters (40c).

Figure 6:
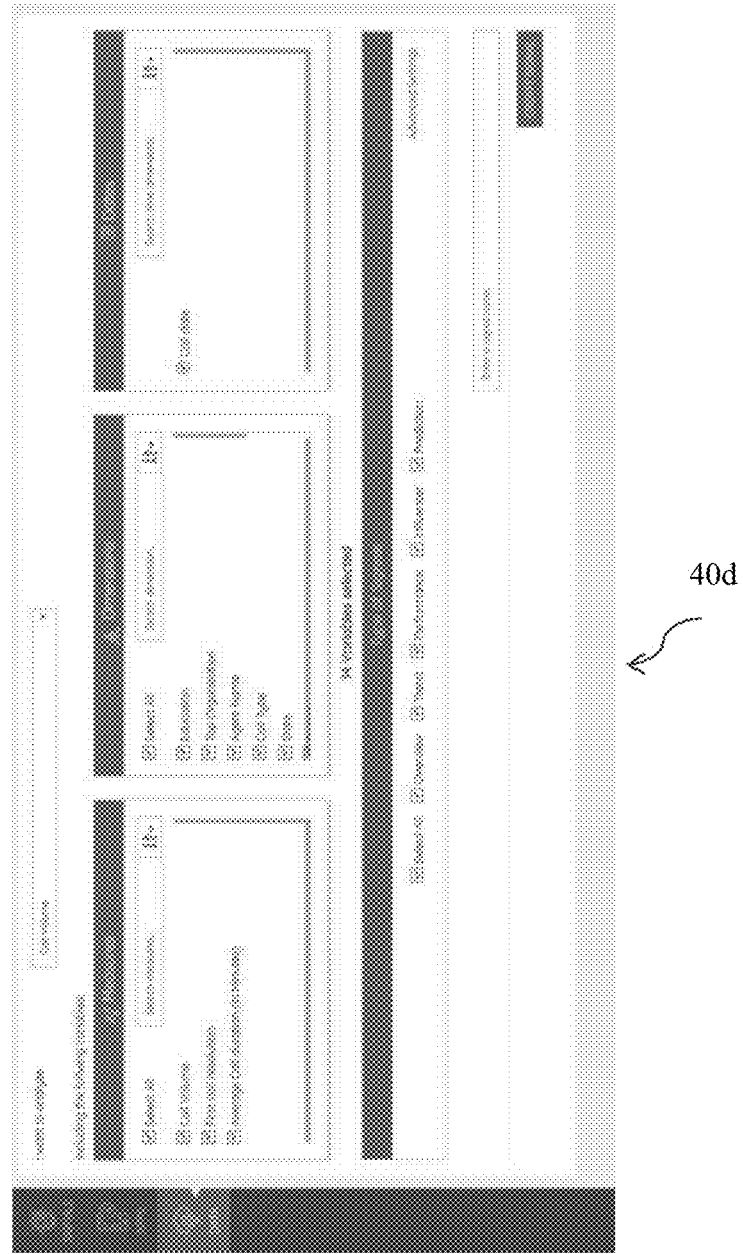
FIG. 6 is a schematic representation of fourth page of the graphical user interface of the system for analysis and representation of data of FIG. 1 in accordance with an embodiment of the present disclosure.

FIG. 6 is a schematic representation of fourth page of the graphical user interface of the system for analysis and representation of data of FIG. 1 in accordance with an embodiment of the present disclosure. The graphical user interface of the system (40) may display a plurality of parameters such as the measure, the dimension and the dates (40d). The user may now select a plurality of parameters of desired choice. Based on the selection of the parameters, the system (40) may perform the analysis. The selected plurality of parameters under the measures may be a call volume, a first call resolution and average call duration (40d). The selected plurality of parameters under the dimensions may include education, a top organisation, an agent name, a call type or a state (40d). The user may select multiple dimensions or all the dimensions displayed. The selected plurality of parameters under the dates may include a call date. Further, once the user selects the plurality of parameters of his choice and select create signal, the graphical user interface of the system (40) may further proceed with the analysis of the call data.

Figure 7:
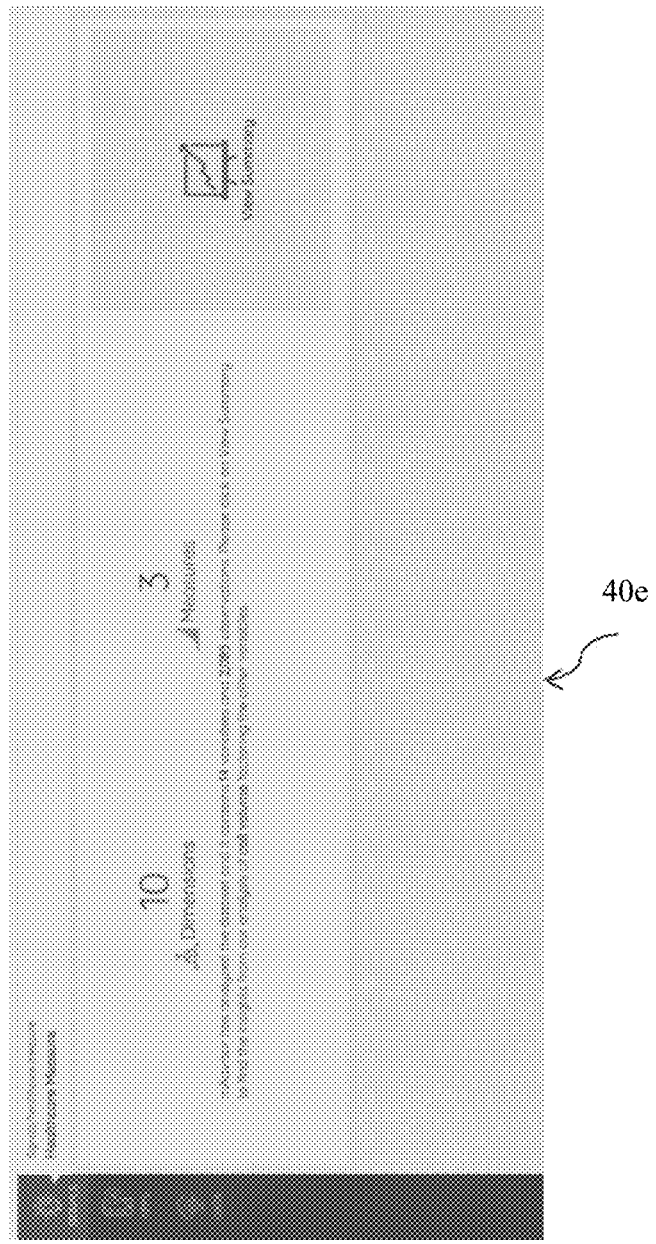
FIG. 7 is a schematic representation of fifth page of the graphical user interface of the system for analysis and representation of data of FIG. 1 in accordance with an embodiment of the present disclosure.

FIG. 7 is a schematic representation of fifth page of the graphical user interface of the system for analysis and representation of data of FIG. 1 in accordance with an embodiment of the present disclosure. The graphical user interface of the system (40) displays the number of selected plurality of parameters and may provide an option to view a summary of the selected plurality of parameters (40e). As shown, the graphical user interface displays 10 dimensions which may be the selected dimensions by the user (40e). The graphical user interface may also display 3 measures, which may be the selected measures by the user (40e). The user may now select view summary to view the presentation of the analysed plurality of data sets and the textual insights created based on the analysed graph (40e).

Figure 8:
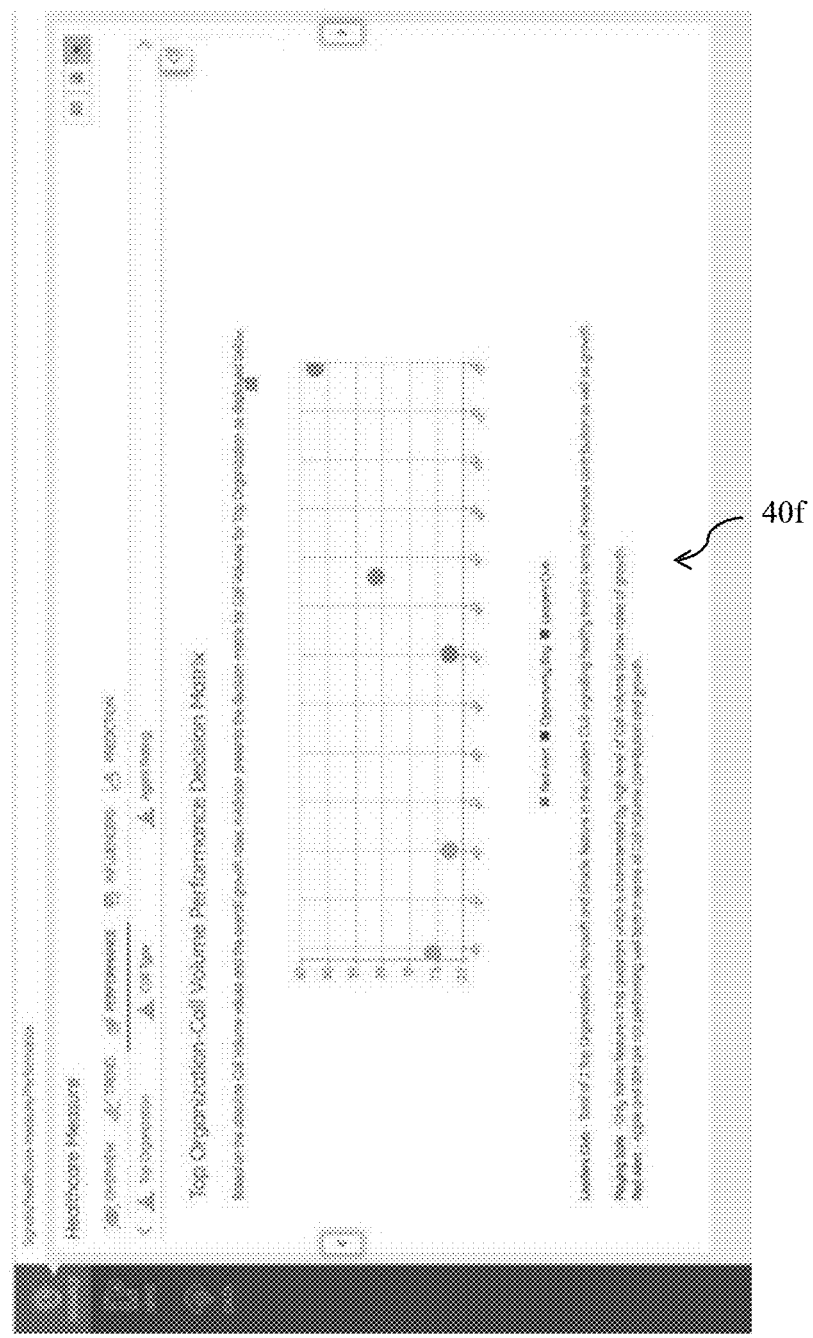
FIG. 8 is a schematic representation of sixth page of the graphical user interface of the system for analysis and representation of data of FIG. 1 in accordance with an embodiment of the present disclosure.

FIG. 8 is a schematic representation of sixth page of the graphical user interface of the system for analysis and representation of data of FIG. 1 in accordance with an embodiment of the present disclosure. The graphical user interface of the system (40) may represent a plurality of combinations of the selected plurality of parameters and the plurality of data sets (40f). In one case, the graphical user interface may display a graph and the textual insight for the selected plurality of parameters such as the top organisation and call volume (40f). In such embodiment, the display graph may be a bar graph, a line graph, a venn diagram, a histogram, a scatter plot chart, a candlestick chart, a pie chart or an area chart.

Figure 9:
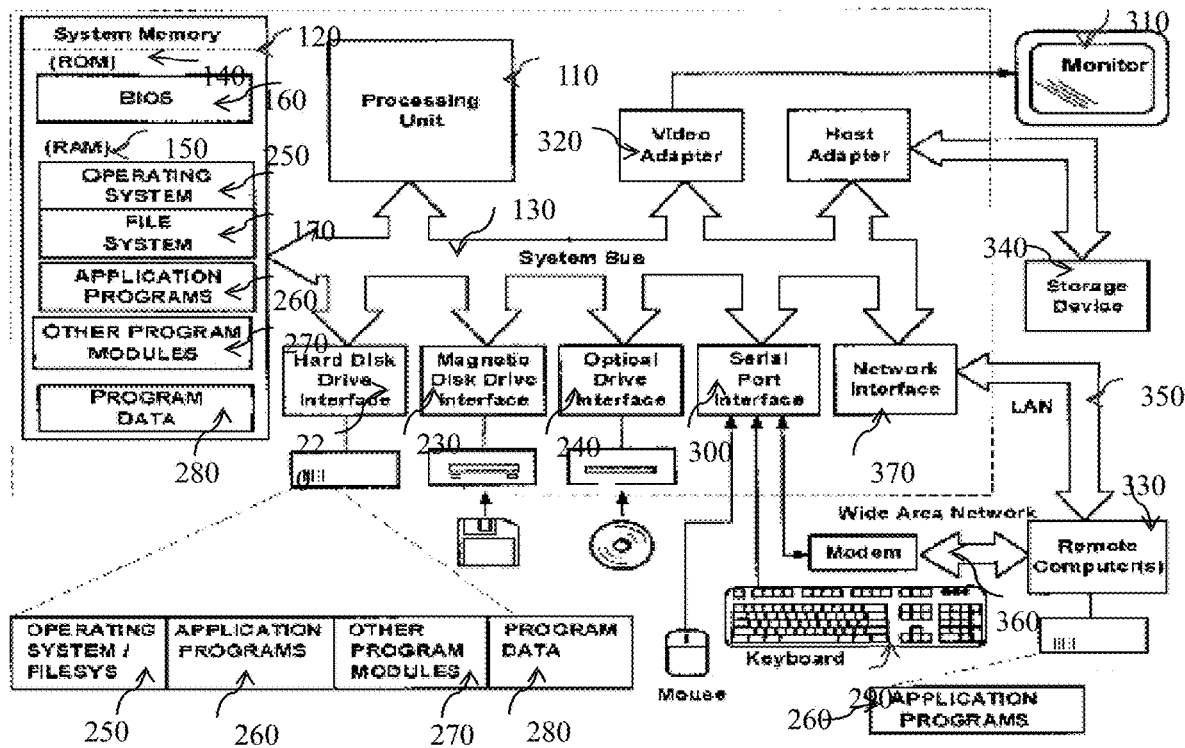
FIG. 9 is a block diagram of an exemplary system of a computer or a server in accordance with an embodiment of the present disclosure.

FIG. 9 is a block diagram of an exemplary system (100) of a computer or a server in accordance with an embodiment of the present disclosure. The exemplary system (100) for data analysis and presentation of data (10) includes a general-purpose computing device in the form of a computer (100) or a server or the like. The computer (100) includes including a processing unit (110) substantially similar to the processing subsystem (15) of FIG. 1, and configured to analyse and present the plurality of data sets, a system memory (120) substantially similar to the memory (12) of FIG. 1, and configured to store the plurality of internal data sets and the plurality of external data sets. The processing subsystem includes the data accumulator, the expert rule system, the algorithm selector, the job sequencer, the data processing engine, the visualization builder and the insights generator. The computer (100) also includes a system bus (130) that couples various system components including the system memory (100) to the processing unit (110).

The system bus (130) may be any of several types of bus structures including a memory bus or memory controller, a peripheral bus, and a local bus using any of a variety of bus architectures. The system memory (120) includes read-only memory (ROM) (140) and random access memory (RAM) (150). A basic input/output system (BIOS) (160), containing the basic routines that help transfer information between elements within the computer (100), such as during start-up, is stored in ROM (140).

The computer (100) may further include a hard disk drive for reading from and writing to a hard disk, not shown, a magnetic disk drive for reading from or writing to a removable magnetic disk, and an optical disk drive for reading from or writing to a removable optical disk such as a CD-ROM, DVD-ROM or other optical media.

The hard disk drive, magnetic disk drive, and optical disk drive 30 are connected to the system bus by a hard disk drive interface (220), a magnetic disk drive interface (230), and an optical drive interface (240), respectively. The drives and their associated computer-readable media provide non-volatile storage of computer readable instructions, data structures, program modules and other data for the computer (100) to the various results generated from the data processing unit (110).

Although the exemplary environment described herein employs a hard disk, a removable magnetic disk and a removable optical disk, it should be appreciated by those skilled in the art that other types of computer readable median that can store data that is accessible by a computer, Such as magnetic cassettes, flash memory cards, digital video disks, Bernoulli cartridges, random access memories (RAMS), read-only memories (ROMs) and the like may also be used in the exemplary operating environment.

A number of program modules may be stored on the hard disk, magnetic disk, optical disk, ROM (140) or RAM (150), including an operating system (250). The computer (100) includes a file system (170) associated with or included within the operating system (250), one or more application programs (260), other program modules (270) and program data (280). A user may enter commands and information into the computer (100) through input devices (290) such as a keyboard and pointing device. Other input devices (not shown) may include a microphone, joystick, game pad, Satellite dish, Scanner or the like.

These and other input devices are often connected to the data processing unit (110) through a serial port interface (300) that is coupled to the system bus, but may be connected by other interfaces, such as a parallel port, game port or universal serial bus (USB). A monitor (310) or other type of display device is also connected to the system bus (130) via an interface. Such as a video adapter (320). In addition to the monitor (310), personal computers typically include other peripheral output devices (not shown), such as speakers and printers.

The computer (100) may operate in a networked environment using logical connections to one or more remote computers (330). The one or more remote computer (330) may be another computer, a server, a router, a network PC, a peer device or other common network node, and typically includes many or all of the elements described above relative to the computer (100), although only a memory storage device (340) has been illustrated. The logical connections include a local area network (LAN) (350) and a wide area network (WAN) (360). Such networking environments are common place in offices, enterprise-wide computer networks, Intranets and the Internet.

When used in a LAN (350) networking environment, the computer (100) is connected to the local network (350) through a network interface or adapter (370). When used in a WAN (360) networking environment, the computer (100) typically includes a modem (380) or other means for establishing communications over the wide area network (360), such as the Internet.

The modem (380), which may be internal or external, is connected to the system bus (130) via the serial port interface (300). In a networked environment, program modules depicted relative to the computer (100), or portions thereof, may be stored in the remote memory storage device. It will be appreciated that the network connections shown are exemplary and other means of establishing a communications link between the computers may be used.

Figure 10:
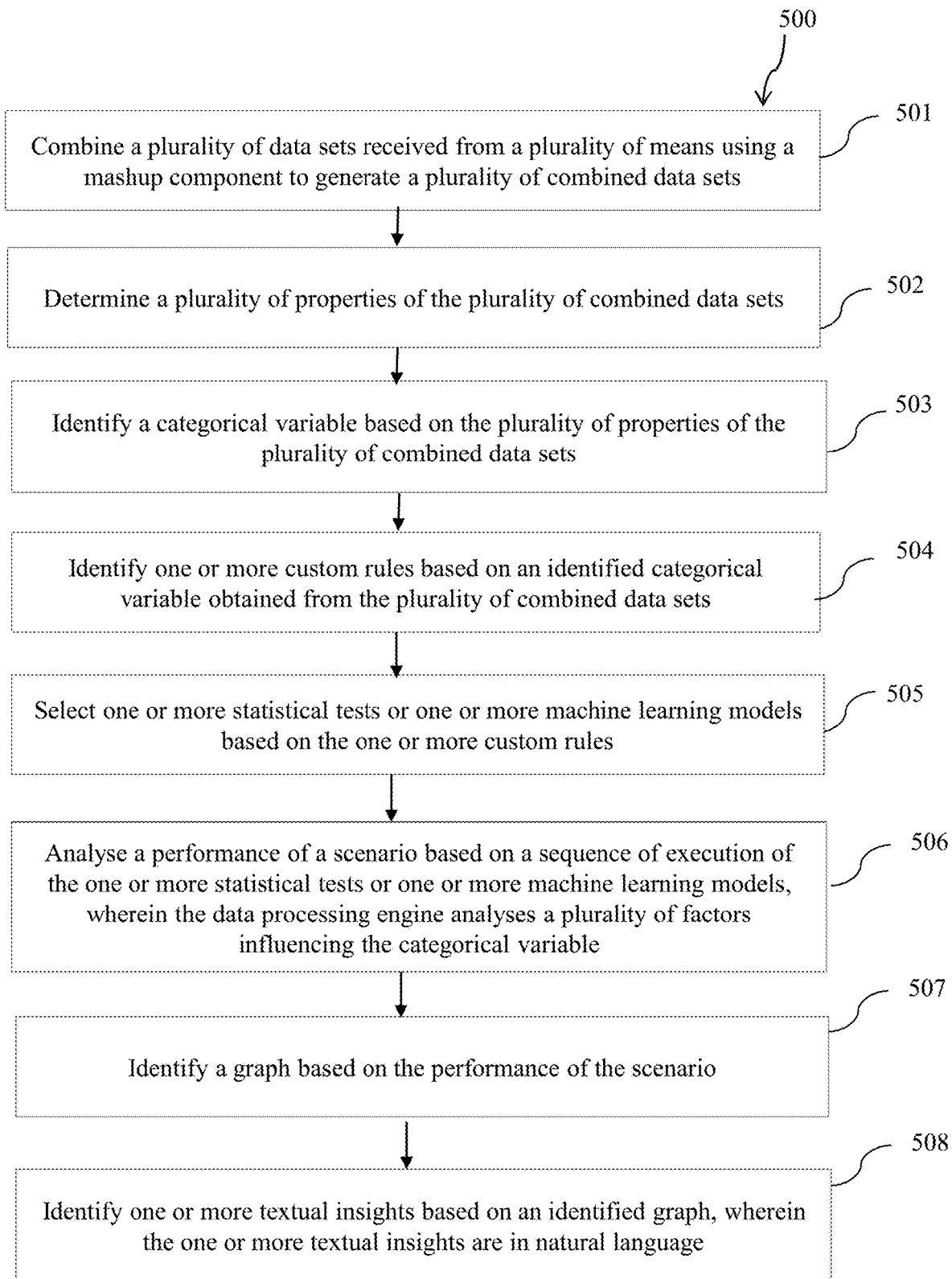
FIG. 10 is a process flow for the data analysis and presentation of data in accordance with the embodiment of the present disclosure.

FIG. 10 is a process flow for the data analysis and presentation of data in accordance with the embodiment of the present disclosure. The method (500) includes receiving a plurality of data sets (501). In one embodiment, receiving the plurality of data set (501) may include receiving the plurality of data from a plurality of means such as a web, a manual entry of data, a local data and an experimental data.

The method (500) also includes determining a plurality of properties of the plurality of data sets (502). In one embodiment, the plurality of properties may be the instruction set, the data type, the hierarchy of data and the category of data.

The method (500) further includes analysing the categorical variable of the plurality of data sets based on the plurality of properties of the plurality of data sets (503). In one embodiment, the plurality of data sets may be a plurality of structured data, a plurality of unstructured data or a plurality of semi-structured data.

The method (500) further includes identifying one or more custom rules based on the plurality of data set (504). The method (500) further includes interpreting the identified one or more custom rules (505). In one embodiment, the method (500) wherein interpreting the identified one or more custom rules (505) may further include identifying one or more statistical tests based on one or more identified custom rules. In one embodiment, identifying the one or more statistical tests based on use case, feature transformation, feature selection and optimization based on the data sizes. The method (500) wherein interpreting the identified one or more custom rules (505) may further include selecting a sequence for the identified one or more statistical tests.

The method (500) wherein interpreting the identified one or more custom rules (505) may further include interpreting one or more selected statistical tests. The method (500) wherein interpreting the identified one or more custom rules (505) may further include prioritising the one or more interpreted statistical tests. The method (500) wherein interpreting the identified one or more custom rules (505) may further include presenting the one or more prioritised statistical tests graphically. The method (500) wherein interpreting the identified one or more custom rules (505) may further include generating one or more textual insights from the represented graph of the one or more interpreted statistical tests.

The method (500) further includes identifying a graph based on one or more custom rules (506). In one specific embodiment, the method for identifying a graph on one or more custom rules to identify one or more textual insights may include identifying appropriate one or more statistical tests.

The method (500) further include identifying one or more textual insights based on identified one or more custom rules and the identified graph (507). The method (500) further includes presenting the identified graph and one or more textual insights (508). In one embodiment, presenting the one or more textual insights comprises presenting one or more insights in a natural language.

Various embodiments of the system described above enables the automatic analysis of data and presentation of the analysed data graphically and also in the form of textual insights.

Also the system has the ability to comprehend and monetize the plurality of data sets of huge size. The analysis and presentation of data is very fast and hence saves time which makes the system effective.

Further the system has no dependency on a data scientists and analysts to create brief about the plurality of data sets to be analysed. Also the system is expandable and scalable to adoption of new cases.

Further, the system produces insights which are specific to the analysis performed and are easily readable and understandable by the user, which makes the user to spend less time in further analysing the textual insights. The system also predicts the plurality of data sets to be analysed and hence does not miss out on any data set.

Also the system may help the user to determine some of the most common characteristic of key values under the target categorical variable. Further, the system also leverages prescriptive analytics approach on the dataset, to analyse potential decisions, interactions between decisions and influences on possible outcomes, to prescribe an optimal decision of action.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for data analysis and presentation of data comprising:
   a memory configured to receive a plurality of data sets from a plurality of means;
   a processing subsystem operatively coupled to the memory wherein the processing subsystem comprises:

a data accumulator configured to combine the plurality of data sets received from the plurality of means using a mashup component to generate a plurality of combined data sets;
an expert rule system configured to:
    determine a plurality of properties of the plurality of combined data sets;
    identify one or more categorical variables based on the plurality of properties of the plurality of combined data sets;
    select a categorical variable from one or more of identified categorical variables;
    identify one or more custom rules based on a selected categorical variable obtained from the plurality of combined data sets;
an algorithm selector configured to select one or more statistical tests or one or more machine learning models based on the one or more custom rules;
a job sequencer configured to decide a sequence and manage the execution of the one or more statistical tests or one or more machine learning models;
a data processing engine configured to:
    analyse a performance of a scenario based on the sequence of execution of the one or more statistical tests or one or more machine learning models;
    analyse a plurality of factors influencing the identified categorical variable comprising:
        determine an impact of selected dimension parameters on the chosen categorical variable, wherein the dimension parameters are entities and comprise at least one of an organisation, an agent name, a state, education and a call type;
        determine an impact of measures over the selected categorical variable, wherein measures are measurable quantities and comprise at least one of count, volume, and time duration;
        generate recommendation results to increase or optimize the categorical variable based on the impact of the selected dimension parameters and the impact of the measures using prescriptive analytics;
a visualization builder configured to identify a graph based on the performance of the scenario;
display count of selected dimension parameters, selected measures and a selectable user interface element for viewing presentation of the analysed data and textual insights to be created based on the identified graph;
an insights generator configured to:
    identify one or more textual insights based on an identified graph;
    generate the one or more textual insights in a natural language; and
a display device configured to present the identified graph and the one or more textual insights.

2. The system as claimed in claim 1, wherein the plurality of data sets comprises a plurality of structured data, a plurality of unstructured data or a plurality of semi-structured data.

3. The system as claimed in claim 1, wherein the plurality of properties of the plurality of data sets comprises an instruction set, a data type, a hierarchy of data and a category of data.

4. A method for data analysis and presentation of data comprising:

receiving, by a memory, a plurality of data sets from a plurality of means;
combining, by a data accumulator, the plurality of data sets received from the plurality of means using a mashup component to generate a plurality of combined data sets
determining, by an expert rule system, a plurality of properties of the plurality of combined data sets;
identifying, by the expert rule system, one or more categorical variables based on the plurality of properties of the plurality of combined data sets;
selecting, by the expert rule system, a categorical variable from one or more identified categorical variables;
identifying, by the expert rule system, one or more custom rules based on a selected categorical variable obtained from the plurality of data combined sets;
selecting, by an algorithm selector, one or more statistical tests or one or more machine learning models based on the one or more custom rules;
deciding, by a job sequencer, a sequence and manage the execution of the one or more statistical tests or one or more machine learning models;
analysing, by a data processing engine, a performance of a scenario based on the sequence of execution of the one or more statistical tests or one or more machine learning models, wherein the data processing engine is configured to analyse a plurality of factors influencing the identified categorical variable, wherein analysing the plurality of factors comprises:
    determining an impact of selected dimension parameters on the chosen categorical variable, wherein the dimension parameters are entities and comprise at least one of an organisation, an agent name, a state, education and a call type;
    determining an impact of measures over the selected categorical variable, wherein measures are measurable quantities and comprise at least one of count, volume, and time duration;
    generating recommendation results to increase or optimize the categorical variable based on the impact of the selected dimension parameters and the impact of the measures using prescriptive analytics;
identifying, by a visualization builder, a graph based on the performance of the scenario;
displaying count of selected dimension parameters, selected measures and a selectable user interface element for viewing presentation of the analysed data and textual insights to be created based on the identified graph;
identifying, by an insights generator, one or more textual insights based on an identified graph;
generating, by the insights generator, the one or more textual insights in a natural language; and
presenting, by a display device, the identified graph and the one or more textual insights.

5. The method as claimed in claim 4, wherein receiving the plurality of data set comprises receiving the plurality of data from a plurality of means such as a web, a manual entry of data, a local data and an experimental data.

6. The method as claimed in claim 4, wherein identifying one or more textual insights comprises:
    interpreting one or more selected statistical tests;
    prioritising the one or more interpreted statistical tests;
    presenting the one or more prioritised statistical tests graphically; and generating the one or more textual insights from a represented graph of the one or more interpreted statistical tests.

\* \* \* \* \*